United States Patent [19]

Toida et al.

[11] 4,255,682

[45] Mar. 10, 1981

[54] MULTIPOLAR RESOLVER

[75] Inventors: Ryuji Toida; Yuji Sakai; Mitsuru Ikegami, all of Nagoya, Japan

[73] Assignee: Okuma Machinery Works Ltd., Nagoya, Japan

[21] Appl. No.: 34,974

[22] Filed: Apr. 30, 1979

[30] Foreign Application Priority Data

Sep. 25, 1978 [JP] Japan .................................. 53/118206

[51] Int. Cl.³ ............................................. H02K 17/42
[52] U.S. Cl. ..................................... 310/168; 310/171; 310/185; 310/198; 310/254; 336/135; 323/348
[58] Field of Search ................ 310/168, 169, 170, 171, 310/179, 180, 184, 185, 195, 198, 49 R, 254, 261, 264, 269, 268; 336/132, 135; 323/51

[56] References Cited

U.S. PATENT DOCUMENTS

| | | | |
|---|---|---|---|
| 3,041,486 | 6/1962 | Moffitt | 310/168 |
| 3,281,655 | 10/1966 | Blasingame | 336/135 X |
| 3,368,142 | 2/1968 | Bouchard et al. | 323/51 |
| 3,404,359 | 10/1968 | Kawada | 336/135 |
| 3,568,119 | 3/1971 | Ruderman | 336/135 |
| 3,641,467 | 2/1972 | Ringland et al. | 336/135 X |

Primary Examiner—Mark O. Budd
Attorney, Agent, or Firm—Norbert P. Holler; Charles A. Blank

[57] ABSTRACT

A multipolar resolver is so constructed that the need of the conventionally indispensable coil on the resolver rotor is eliminated by providing a center coil on a stator, and 5n or 3n rotor poles and 4n stator poles are provided where n is a positive integer. Sine and consine coils are wound on the stator poles alternately, thus simplifying the construction of the multipolar resolver.

6 Claims, 14 Drawing Figures

MULTIPOLAR RESOLVER

The present invention relates to the field of the multipolar resolver which may employ either a sine or cosine coil for the rotor, or more in particular to a novel and compact multipolar resolver requiring no coil on the rotor.

Generally, the resolver is of dual polarity and has a stator wound with two different types of coils, i.e., sine and cosine coils at an electrical angle of 90 degrees. The rotor is also wound with sine and cosine coils. In the case of the resolver used for position detection instead of calculation, however, it often suffices if only one type of coil is wound on either stator or rotor. Nowadays, the brushless resolver is widely used which has only one type of coil on the rotor.

In these conventional resolvers, the rotor is required to be provided with coil, and therefore the resolver having few poles, say, two poles accounts for the greater proportion of the products. As a result, manufacture of multipolar resolvers is limited greatly in regard to their structure. In fact, the multipolar resolvers presently produced have at most four or six poles.

As a rotational angle detector proposed by the present applicant, the apparatus as disclosed in German Application Publication No. 2,301,483 granted to the present applicant is known. This rotational angle detector utilizes the principle of the vernier scale and is constructed as briefly described below. A coil is provided at substantially the central part of the stator for generating magnetic fluxes, while a coil for detecting the rotational angle of the rotor is provided on each of a plurality of stator poles positioned along the circumference having the same axis as the rotor. The plurality of coils are for detecting a digital angle.

An object of the present invention is to provide a multipolar resolver which requires no coils on the rotor.

Another object of the present invention is to provide a multipolar resolver utilizing the principle of the vernier scale, thus simplifying the general configuration to facilitate production on the one hand and to reduce the production cost on the other hand.

According to one aspect of the present invention, there is provided a multipolar resolver comprising a substantially cylindrical rotor of magnetic material with 5n rotor poles provided equidistantly on the outer periphery thereof where n is a positive integer, a stator of magnetic material with 4n stator poles provided equidistantly along the circumference concentric with the axis of the rotor, a central coil provided on the stator along substantially the same axis as the rotor axis, and sine and cosine coils wound on the stator poles, the sine and cosine coils being wound alternately on the stator poles, the sine coils being connected in series with each other and wound in opposite directions of winding alternately, and the cosine coils being connected in series with each other and wound in opposite directions of winding alternately.

According to another aspect of the present invention, there is provided a multipolar resolver comprising a substantially cylindrical rotor of magnetic material with 3n rotor poles provided equidistantly on the outer periphery thereof where n is a positive integer, a stator of magnetic material with 4n stator poles provided equidistantly along the circumference concentric with the axis of the rotor, a central coil provided on the stator along substantially the same axis as the rotor axis, and sine and cosine coils wound on the stator poles, the sine and cosine coils being wound alternately on the stator poles, the sine coils being connected in series with each other and wound in opposite directions of winding alternately, and the cosine coils being connected in series with each other and wound in opposite directions of winding alternately.

The above and other objects, features and advantages of the present invention will be made more clear from the following description with reference to the accompanying drawings, in which.

Prior to explanatin of the preferred embodiments of the present invention, the above-mentioned prior art will be described again with reference to the companying drawings.

Figure 1:
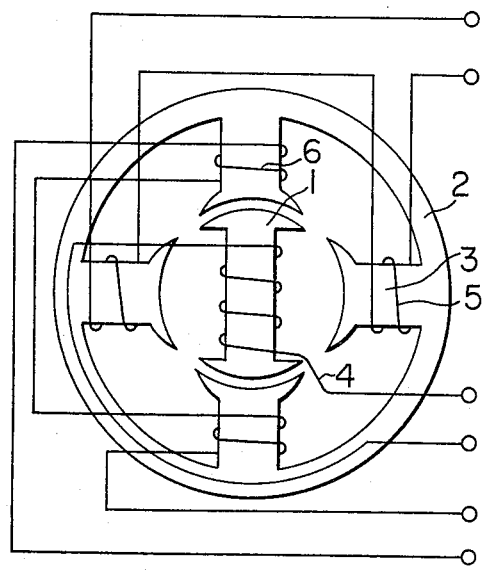
FIG. 1 is a schematic diagram showing the construction of a conventional two-pole resolver.

The construction of the above-mentioned conventional two-pole resolver is schematically shown in FIG. 1. In this diagram, reference numeral 1 shows a rotor, numeral 2 a stator, numeral 3 a stator pole, numeral 4 a single rotor coil, numeral 5 a sine coil provided on the stator, and numeral 6 a cosine coil provided on the stator. If the number of the resolver poles is increased to four or six in this conventional construction, the number of stator poles is increased to twice or thrice accordingly and the rotor geometry is increasingly complicated, so that the general configuration is complicated on the one hand and the dimension thereof are increased on the other hand.

Figure 2:
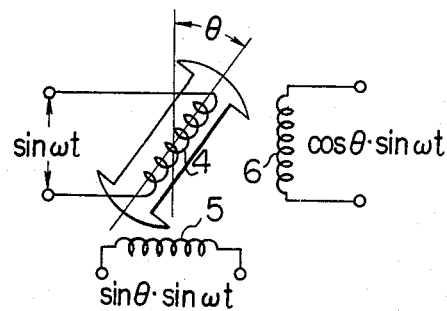
FIG. 2 is a diagram for explaining the operating principle of the two-pole resolver shown in FIG. 1.

The operating principle of the two-pole resolver of FIG. 1 will be seen from FIG. 2. When the rotor coil 4 is excited with the exciting frequency of $\sin \omega t$, the outputs of $\sin \theta \cdot \sin \omega t$ and $\cos \theta \cdot \sin \omega t$ are produced respectively from the stator coils 5 and 6, where $\theta$ is the rotational angle of the rotor.

Figure 3A:
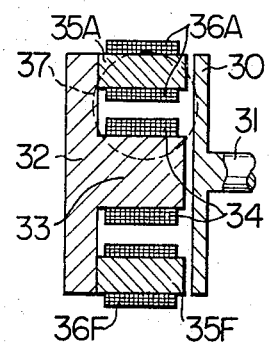
FIGS. 3A and 3B are sectional and plan views respectively schematically showing the construction of the rotational angle detector already proposed by the present applicant.
Figure 3B:
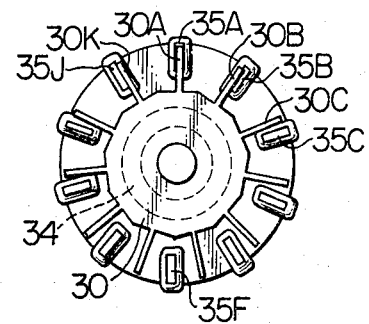

The above-mentioned rotational angle detector suggested by the present applicant is shown in FIGS. 3A and 3B. It will be seen that the disc-like rotor 30 of magnetic material includes radially equidistantly-provided eleven arms 30A to 30K and a rotational shaft 31. The protrusion 33 provided at the central part of the stator 32 of magnetic material is wound with a primary coil 34. The stator 32 has ten stator poles 35A to 35J provided on the circumferential periphery thereof, and the stator poles thereof are wound with secondary coils 36A to 36J respectively. Upon application of the exciting voltage to the primary coil 34, the magnetic fluxes 37 generated by the primary coil 34 pass through the rotor 30, rotor arms, stator poles 35 and stator 32, thus producing an induced voltage in the stator coil 36. If the difference between the number of stator poles and the number of rotor arms is one as in the above-mentioned construction, only one of the stator poles is opposed to or aligned with only one of the arms all the time according to the principle of the vernier scale. Therefore, by detecting the stator coil from which an induced voltage is generated, the rotational angle of the rotor is detected.

The rotational angle detector of this construction, however, is unable to display the functions of the resolver of the present invention.

Figure 4A:
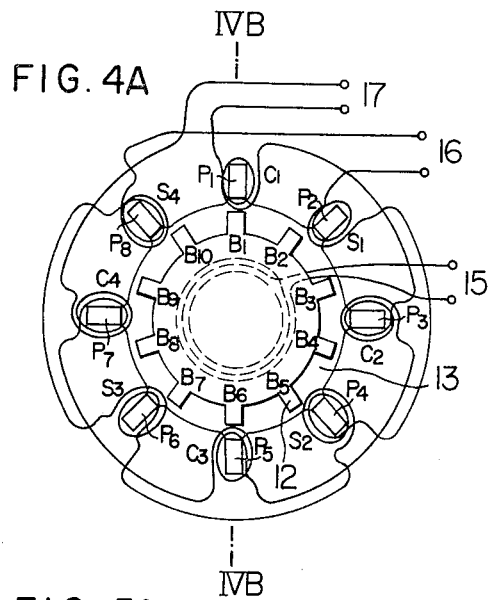
FIGS. 4A and 4B are a plan view schematically showing the construction of an embodiment of a multipolar resolver according to the present invention and a sectional view taken in the line IVB—IVB respectively.
Figure 4B:
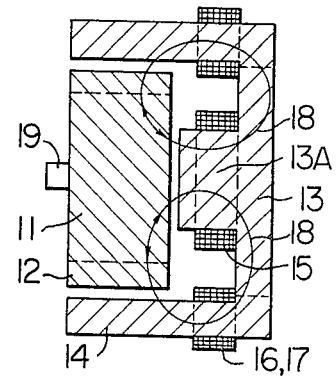

An embodiment of the multipolar resolver according to the present invention will be described below with reference to FIGS. 4A and 4B. In the drawings, the substantially cylindrical rotor 11 made of a magnetic material such as ferrite requiring no coils includes a rotor shaft 19 and ten rotor poles 12 designated by $B_1$ to $B_{10}$ equidistantly arranged on the outer periphery thereof. The substantially disc-shaped stator 13 of magnetic material such as ferrite includes a protrusion 13A at substantially the central part thereof and eight stator poles 14 designated by $P_1$ to $P_8$ arranged substantially equidistantly on the outer periphery and extending in the same direction as the axis 19 of the rotor. The stator protrusion 13A is wound with the central coil 15, and the bases of the stator poles $P_2$, $P_4$, $P_6$ and $P_8$ are wound with sine coils 16, while the poles $P_1$, $P_3$, $P_5$ and $P_7$ are wound with cosine coils 17. As apparent from the drawings, the poles $P_2$, $P_4$, $P_6$, $P_8$ wound with the sine coils 16 are arranged on the outer periphery of the stator 13 alternately with the poles $P_1$, $P_3$, $P_5$, $P_7$ wound with the cosine coils 17. The coils $S_1$, $S_2$, $S_3$ and $S_4$ of the poles $P_2$, $P_4$, $P_6$ and $P_8$ are connected in series with each other. The coils $C_1$, $C_2$, $C_3$ and $C_4$ of the poles $P_1$, $P_3$, $P_5$ and $P_7$ are also connected in series with each other. The sine coils 16 are connected in series with each other in opposite directions of winding in such a manner that the polarity of the output voltage may be reversed at the electrical angle of 180 degrees. In other words, the sine coils are wound in the counterclockwise direction on the stator poles $P_2$ and $P_6$ and in the clockwise direction on the poles $P_4$ and $P_8$. In similar fashion, the cosine coils 17 are wound on the stator poles $P_1$ and $P_5$ in the counterclockwise direction and on the poles $P_3$ and $P_7$ in the clockwise direction. The substantially cylindrical rotor 11 is rotatably arranged in a substantially concave cylindrical space formed by the side walls of the stator protrusion 13A and a plurality of stator poles 14. The side wall of the stator protrusion 13A is thus arranged in proximity to the side surface of the rotor perpendicular to the rotor shaft 19. Also, the rotor pole 12 and the stator pole 14 are arranged in proximity to each other. The stator 13 is preferably formed integrally with the stator poles 14. The magentic fluxes 18 generated by the excitation of the central coil 15 are thus passed through the stator protrusion 13A, stator 13, stator pole 14, rotor pole 12 and rotor 11 as shown in FIG. 4B. Although every coil has the same number of turns, the induced voltage of each coil varies depending on the degree of proximity between rotor pole 12 and stator pole 14, i.e., the degree of magnetic coupling therebetween. The total of the voltages induced in the coils $S_1$, $S_2$, $S_3$ and $S_4$ shown in the drawing is produced at the sine coil 16. In similar manner, the total of the voltages induced in the shown coils $C_1$, $C_2$, $C_3$ and $C_4$ is obtained at the cosine coil 17.

Next, explanation will be made of the operation for producing an output voltage with the rotation of the resolver upon excitation of the central coil with reference to FIGS. 5A to 5E and FIG. 7.

Figure 5A:
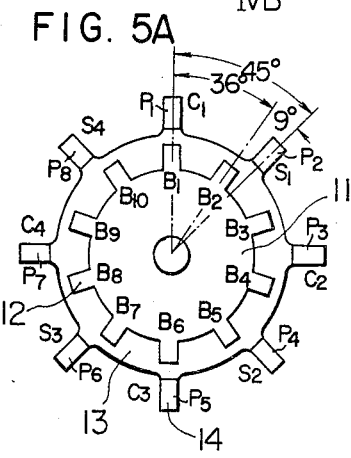
FIGS. 5A to 5E are diagrams for explaining the operation of the multipolar resolver shown in FIGS. 4A and 4B.

(1) In the case where the rotor pole $B_1$ is opposed to or aligned with the stator pole $P_1$ (FIG. 5A);

The rotor pole $B_6$ and the stator pole $P_5$ are also aligned with each other so that the degree of magnetic coupling between coils $C_1$ and $C_3$ is maximum, thus producing the maximum voltage. On the other hand, the magnetic coupling between coils $C_2$ and $C_4$ is small, thus producing a minimum voltage. The coils $C_2$ and $C_4$ are wound in the direction opposite to the coils $C_1$ and $C_3$, so that the cosine coil 17 produces the voltage $\cos\theta_E\cdot\sin\omega t$ which is equal to the sum of the voltage across coils $C_1$ and $C_3$ less the sum of the voltages across the coils $C_2$ and $C_4$. The degree of magnetic coupling between poles $P_2$ and $B_2$, between poles $P_4$ and $B_5$, between poles $P_6$ and $B_7$ and between poles $P_8$ and $B_{10}$ are substantially equal to each other. Therefore, the sum of the voltages across coils $S_1$ and $S_3$ less the sum of the voltages across the coils $S_2$ and $S_4$ is substantially zero, so that the output voltage $\sin\theta_E\cdot\sin\omega t$ of the sine coil 16 is zero.

Figure 7:
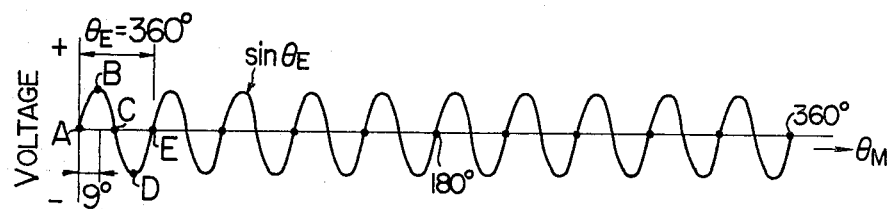
FIG. 7 is a graph showing $\sin \theta_E$ which is the sine component of the output voltage of the multipolar resolver shown in FIGS. 4A and 4B.

Referring to FIG. 7 showing the value of $\sin\theta_E$ which is the sine component of the rotational angle of the rotor, the value of $\sin\theta_E$ of the voltage $\sin\theta_E\cdot\sin\omega t$ obtained from the sin coil 16 when the rotor pole $B_1$ is aligned with stator pole $P_1$ is zero as shown by point A.

(2) In the case where the rotor pole $B_2$ is aligned with stator pole $P_2$ (FIG. 5B):

In FIG. 5A, the angular displacement between stator pole $P_2$ and rotor pole $B_2$ is $1/40$ ($=\frac{1}{8}-1/10$) of a rotation, i.e., 9 degrees ($=45-36$ degrees). Thus when the rotor 11 makes 1/40 of a rotation, i.e., 9 degrees from the position shown in FIG. 5A, it achieves the state shown in FIG. 5B. Since the pole $B_7$ is aligned with pole $P_6$ and the coils $S_1$ and $S_3$ are coupled magnetically to the greatest degree, a maximum voltage is produced. The coils $S_2$ and $S_4$ are magnetically coupled with each other to the lowest degree, and therefore a minimum voltage is produced therefrom. The coils $S_2$ and $S_4$ are wound in the direction opposite to the coils $S_1$ and $S_3$ as described above, so that the sine coil 16 produces an output voltage $\sin\theta_E\cdot\sin\omega t$ which is equal to the sum of the voltages across the coils $S_1$ and $S_3$ less the sum of the voltages across coils $S_2$ and $S_4$. The value of $\sin\theta_E$ is shown by point B in FIG. 7. The degree of magnetic coupling between poles $P_1$ and $B_1$, between $P_3$ and $B_3$, between $P_5$ and $B_6$ and between $P_7$ and $B_8$ are substantially equal to each other, with the result that the sum of the voltages across the coils $C_1$ and $C_3$ less the sum of voltages across the coils $C_2$ and $C_4$ is substantially zero. Thus the output voltage $\cos\theta_E\cdot\sin\omega t$ of the cosine coil 17 is substantially zero.

Figure 5B:
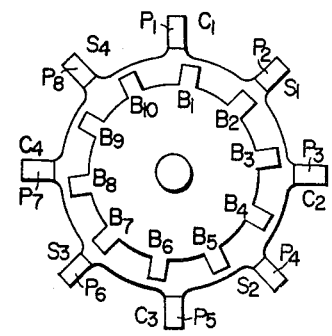
Figure 5C:
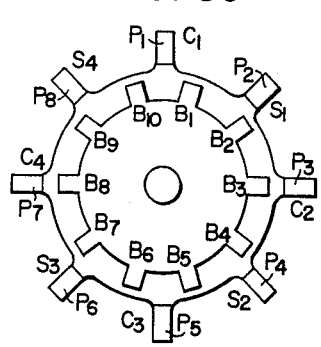

(3) In the case where the rotor pole $B_3$ is aligned with stator pole $P_3$ (FIG. 5C):

When the rotor 11 makes 1/40 of a rotation or 9 degrees from the position of FIG. 5B, the state shown in FIG. 5C is attained. The pole $B_8$ is also aligned with the pole $P_7$, and the degree of magnetic coupling between coils $C_2$ and $C_4$ is maximum, thus producing the maximum voltage. On the other hand, the degree of magnetic coupling between coils $C_1$ and $C_3$ is lowest and therefore a minimum voltage is produced. Since the coils $C_1$ and $C_3$ are wound in the direction opposite to the direction of coils $C_2$ and $C_4$, the cosine coil 17 produces an output voltage $\cos \theta_E \cdot \sin \omega t$ which is equal to the sum of the voltages across the coils $C_2$ and $C_4$ less the sum of the voltages across the coils $C_1$ and $C_3$. In this case, the phase of the output voltage is displaced by 180 degrees from that in the case of FIG. 5A. The degree of magnetic coupling between poles $P_2$ and $B_2$, between $P_4$ and $B_4$, between $P_6$ and $B_7$ and between $P_8$ and $B_9$ are substantially the same. The sum of the voltages across the coils $S_2$ and $S_4$ less the sum of the voltages across the coils $S_1$ and $S_3$ is zero, so that the output voltage $\sin \theta_E \cdot \sin \omega t$ of the sine coil 16 is substantially zero. The value of $\sin \theta_E$ is indicated by point C in FIG. 7.

Figure 5D:
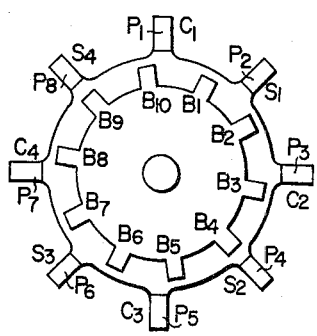

(4) In the case where rotor pole $B_4$ is aligned with stator pole $P_4$ (FIG. 5D):

When the rotor 11 makes 1/40 of a rotation from the position of FIG. 5C, the state of FIG. 5D is attained. The pole $B_9$ is also aligned with pole $P_8$ and the degree of magnetic coupling between coils $S_2$ and $S_4$ is maximum, thus producing a maximum voltage. On the other hand, the degree of magnetic coupling between coils $S_1$ and $S_3$ is lowest, and therefore both $S_1$ and $S_3$ produce a minimum voltage. The coils $S_1$ and $S_3$ are wound in the direction opposite to that of the coils $S_2$ and $S_4$, and therefore the sine coil 16 produces an output voltage $\sin \theta_E \cdot \sin \omega t$ which is the sum of the voltages across the coils $S_2$ and $S_4$ less the sum of voltages across coils $S_1$ and $S_3$. In this case, however, the phase of the output voltage is displaced by 180 degrees from that in the case of FIG. 5B. The value of $\sin \theta_E$ is indicated by point D in FIG. 7. The degree of magnetic coupling between $P_1$ and $B_{10}$, between $P_3$ and $B_3$, between $P_5$ and $B_5$ and between $P_7$ and $B_8$ are substantially equal to each other. The sum of the voltages across the coils $C_2$ and $C_4$ less the sum of the voltages across the coils $C_1$ and $C_3$ is substantially zero, so that the output voltage $\cos \theta_E \cdot \sin \omega t$ of the cosine coil 17 is substantially zero.

Figure 5E:
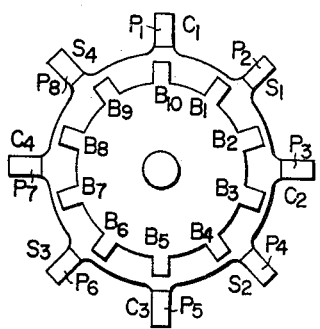

(5) In the case where the rotor pole $B_5$ is aligned with stator pole $P_5$ (FIG. 5E):

When the rotor 11 makes 1/40 of a rotation from the position of FIG. 5D, the state of FIG. 5E is attained. The pole $B_{10}$ is aligned with the pole $P_1$, which is quite the same electrical situation as that shown in FIG. 5A. In other words, the rotor 11 returns to quite the same state electrically as the original state after making 1/10 ($=1/40 \times 4$) of a rotation as shown progressively in FIGS. 5A, 5B, 5C, 5D and 5E in that order, the 1/10 rotation of the rotor 11 being equivalent to the electrical angle of 360 degrees. The value of $\sin \theta_E$ is indicated by point E in FIG. 7.

In the above-mentioned embodiment, the rotor has ten poles, and therefore one mechanical rotation of the rotor 11 corresponds to ten times the electrical angle of 360 degrees, thus indicating a resolver of 20 poles.

Figure 6:
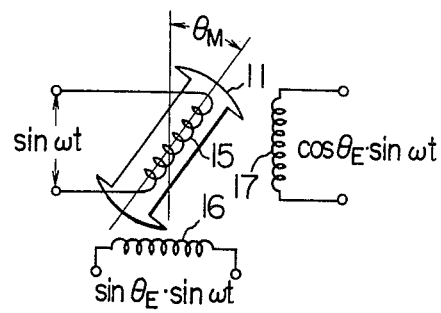
FIG. 6 is a diagram for explaining the operating principle of the multipolar resolver shown in FIGS. 4A and 4B.

It is seen from the diagram of FIG. 6 for explaining the operating principle that upon excitation of the central coil 15 by the sine wave of, say, 10 KHz, the rotation of rotor 11 by the mechanical angle of $\theta_M$ causes the output wave forms of $\cos \theta_E \cdot \sin \omega t$ and $\sin \theta_E \cdot \sin \omega t$ to be produced from the cosine coil 17 and the sine coil 16 respectively. The character $\theta_E$ shows an electrical angle, and there is a well-known relation shown below between the mechanical angle $\theta_M$ and the number of poles N.

$$\theta_E = \frac{N}{2} \theta_M$$

In the foregoing embodiment of the present invention, the central coil 15 is used as the primary coil and the sine coil 16 and the cosine coil 17 as the secondary coil. They may of course be used in reverse way.

Further although the above-mentioned embodiment of the present invention employs eight stator poles and ten rotor poles, it is not limitative but only illustrative. In other words, the number of stator poles n times 4 and the number of rotor poles n times 5 or 3 may be used alternatively as shown in Table 1 below. It is in order to obtain sine and cosine outputs that the number of stator poles n times 4 is employed.

TABLE 1

| n | Number of stator poles | - | Number of rotor poles | Number of resolver poles | Number of stator poles | - | Number of rotor poles | Number of resolver poles |
|---|---|---|---|---|---|---|---|---|
| 1 | 4 | - | 5 | 10 | 4 | - | 3 | 6 |
| 2 | 8 | - | 10 | 20 | 8 | - | 6 | 12 |
| 3 | 12 | - | 15 | 30 | 12 | - | 9 | 18 |
| 4 | 16 | - | 20 | 40 | 16 | - | 12 | 24 |
| 5 | 20 | - | 25 | 50 | 20 | - | 15 | 30 |
| . | . | . | . | . | . | . | . | . |
| . | . | . | . | . | . | . | . | . |
| . | . | . | . | . | . | . | . | . |

Figure 8:
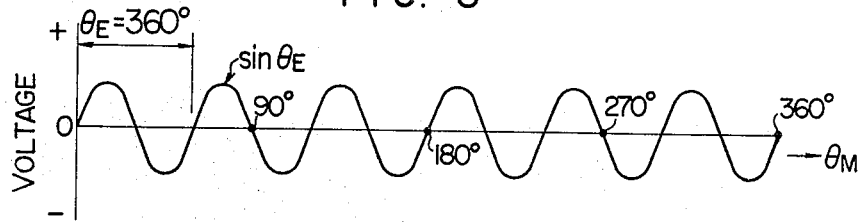
FIG. 8 is a graph showing $\sin \theta_E$ which is the sine component of the output voltage of the multipolar resolver according to another embodiment of the present invention.

An output waveform in a multipolar resolver according to another embodiment is shown in FIG. 8. This voltage waveform represents a sine component of the rotor rotational angle produced by a 12-pole resolver having eight stator poles and 6 rotor poles. As explained above, the multipolar resolver according to the present invention has a coil only on the stator but not on the rotor. This eliminates the need of the slip ring on the one hand and simplifies the general construction on the other hand, leading to many advantages in cost and maintenance.

Furthermore, by introducing the vernier concept, the fabrication of a multipolar resolver having 20 or more poles is greatly facilitated, resulting in the conspicuous dual advantages of a greater number of divisions available for each rotor rotation and a higher accuracy of each rotor rotation without structural or dimensional limitations. The higher accuracy means that it is no longer necessary to drive the resolver at high speed by raising the gear ratio, leading to the advantage that the resolver may be directly coupled to the motor shaft in numerically controlled machine tool field. Since the resolver according to the present invention is adapted to be directly coupled to the motor shaft without sacrificing the required accuracy, the resolver may be constructed integrally with the motor, thus greatly contributing to a simplified detecting mechanism. Also, the availability of an increased number of divisions makes possible reliable detection of a speed component.

What is claimed is:

1. A multipolar resolver comprising a substantially cylindrical rotor of magnetic material with 5n rotor poles provided equidistantly on the outer periphery thereof where n is a positive integer, a stator of magnetic material with 4n stator poles proveded equidistantly along the circumference concentric with the axis of said rotor, a central coil provided on said stator along substantially the same axis as said rotor axis, and sine and cosine coils wound on said stator poles, said sine and cosine coils being wound alternately on said stator poles, said sine coils being connected in series with each other and wound in opposite directions of winding alternately, and said cosine coils being connected in series with each other and wound in opposite directions of winding alternately.

2. A multipolar resolver according to claim 1, wherein said central coil is excited, so that induced voltages representing the sine and cosine components of the rotational angle of said rotor are produced from said sine and cosine coils respectively.

3. A multipolar resolver according to claim 1, wherein said sine and cosine coils are excited, so that an induced voltage representing the rotational angle of said rotor is produced from said central coil.

4. A multipolar resolver comprising a substantially cylindrical rotor of magnetic material with 3n rotor poles provided equidistantly on the outer periphery thereof where n is a positive integer, a stator of magnetic material with 4n stator poles provided equidistantly along the circumference concentric with the axis of said rotor, a central coil provided on said stator along substantially the same axis as said rotor axis, and sine and cosine coils wound on said stator poles, said sine and cosine coils being wound alternately on said stator poles, said sine coils being connected in series with each other and wound in opposite directions of winding alternately, and said cosine coils being connected in series with each other and wound in opposite directions of winding alternately.

5. A multipolar resolver according to claim 4, wherein said central coil is excited, so that induced voltages representing the sine and cosine components of the rotational angle of said rotor are produced from said sine and cosine coils respectively.

6. A multipolar resolver according to claim 4, wherein said sine and cosine coils are excited, so that an induced voltage representing the rotational angle of said rotor is produced from said central coil.

* * * * *